United States Patent Office 3,152,882
Patented Oct. 13, 1964

3,152,882
METHOD FOR DESTROYING WEEDS
Raymond W. Luckenbaugh, Wilmington, Del., assignor to E. I. du Pont de Nemours and Company, Wilmington, Del., a corporation of Delaware
No Drawing. Filed June 1, 1961, Ser. No. 114,044
2 Claims. (Cl. 71—2.5)

This invention relates to herbicidal compositions and methods employing a herbicidally active polychlorobenzoic acid compound in admixture with a herbicidally active substituted triazine.

Recently a number of polychlorobenzoic acid compounds have been found to possess herbicidal activity. The polychlorobenzoic acid compounds useful in the combinations of this invention are represented by the general formula:

(1) 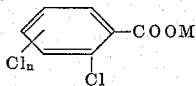

where M is selected from the group consisting of hydrogen, an alkali metal ion, ammonium ion, methylammonium ion, dimethylammonium ion, trimethylammonium ion, and ethylenediammonium ion, and $n$ is the integer 2 and 3.

Preferably, the polychlorobenzoic acid compounds used in the combinations of this invention are selected from the class consisting of 2,3,5-trichlorobenzoic acid, 2,3,6-trichlorobenzoic acid, 2,3,4,6-tetrachlorobenzoic acid, and 2,3,5,6-tetrachlorobenzoic acid, and their salts as described above. Mixtures of these acids can also be used. Note that when ethylenediamine salts of polychlorobenzoic acids are involved, the ratio of moles of acid to moles of ethylene diamine can be either 1 to 1 or 2 to 1.

Also, it has recently been found that certain substituted triazines possess herbicidal activity. These substituted triazines, which are employed in the present compositions, are represented by the following formula:

(2) 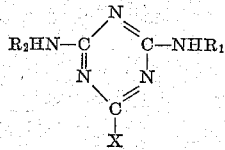

where
X is selected from the group consisting of chlorine, bromine, methoxy, and methylthio,
$R_1$ and $R_2$ are the same or different and are selected from the group consisting of alkyl or alkenyl radicals each containing less than four carbon atoms, and the radical $-(CH_2)_n-OCH_3$, and
$n$ is an integer selected from the group consisting of 2 and 3.

Illustrative of the herbicidally active triazines of Formula 1 are:
2,4-bis(methylamino)-6-chloro-1,3,5-triazine
2,4-bis(ethylamino)-6-chloro-1,3,5-triazine
2,4-bis(propylamino)-6-chloro-1,3,5-triazine
2-chloro-4-isopropylamino-6-methylamino-1,3,5-triazine
2,4 - bis(2-methoxyethylamino)-6-chloro-1,3,5-triazine
2,4-bis(3-methoxypropylamino)-6-chloro-1,3,5-triazine
2 - chloro-4-(2-methoxyethylamino)-6-(3-methoxypropylamino)-1,3,5-triazine
2 - chloro-4-ethylamino-6-(3-methoxypropylamino)-1,3,5-triazine
2,4-bis(ethylamino)-6-methylthio-1,3,5-triazine
2,4-bis(3-methoxypropyl)-6-methylthio-1,3,5-triazine
2,4-bis(ethylamino)-6-methoxy-1,3,5-triazine
2,4-bis(3-methoxypropyl)-6-methoxy-1,3,5-triazine The best herbicidally active s-triazine for use with my compositions and methods are:
2,4-bis(ethylamino)-6-chloro-1,3,5-triazine
2,4-bis(3-methoxypropylamino)-6-chloro-1,3,5-triazine
2 - chloro-4-ethylamino-6-(methoxypropylamino)-1,3,5-triazine
2,4-bis(ethylamino)-6-methoxy-1,3,5-triazine
2,4-bis(3-methoxypropyl)-6-methylthio-1,3,5-triazine
2,4-bis(3-methoxypropyl)-6-methylthio-1,3,5-triazine
2,4-bis(isopropylamino)-6-methoxy-1,3,5-triazine
2 - ethylamino-4-isopropylamino-6-chloro-1,3,5-triazine I have found that herbicidal compositions containing a herbicidally active polychlorobenzoic acid compound of Formula 1 with a herbicidally active substituted triazine of Formula 2 are economically more effective for the control of weeds than are the respective herbicidal components of the mixture when employed separately in amounts sufficient to give the same degree of control.

In my compositions and methods, any of the above herbicidally active polychlorobenzoic acid compounds can be used in combination with any of the above herbicidally active substituted triazines. In fact, in most instances a mixture of polychlorobenzoic acid compounds will be employed in these compositions. Likewise, in some instances it will be desirable to include more than one herbicidally active substituted triazine in these compositions and methods.

The herbicidal compositions of my invention contain any suitable amount of one or more herbicidally active polychlorobenzoic acids in combination with one or more herbicidally active substituted triazines. The exact amounts of each to be employed in each instance can be readily ascertained by those skilled in the art by conventional techniques. In general, the better compositions of the invention contain from about 0.1 to 10 parts by weight of herbicidally active polychlorobenzoic acid compound per part by weight of herbicidally active substituted triazine. However, these compounds appear to be mutually activating, that is, synergistic, when present in proportions ranging from about 0.05 to 20 parts by weight of the benzoic acid compound to 1 part by weight of the substituted triazine. In any given instance, the relative proportions of the active component may vary depending upon the particular compounds employed, the plant species to be controlled, the physiological age of the plants, the type of soil, the prevailing climatic conditions, and the like.

The herbicidal mixtures of the invention can be employed by mixing them with conventional pest control adjuvants or modifiers to provide compositions in the form of solutions, dusts, water-dispersible powders and aqueous dispersions or emulsions. Thus, they can be formulated with a carrier or diluent agent such as a finely divided solid, a solvent liquid of organic origin, water, a wetting agent, an aqueous emulsion or any suitable combination of any of these.

Pest control adjuvants or conditioning agents such as the dusts, solvents, wetting agents, dispersing agents, and emulsifying agents set out in U.S. Patent 2,426,417 can be employed in the preparation of the herbicidal compositions of this invention. Other wetting, dispersing, and emulsifying agents such as those listed in detail in Bulletin E607 of the Bureau of Entomology and Plant Quarantine of the U.S. Department of Agriculture, and such as those set out in an article by McCutcheon in "Soap and Chemical Specialties," volume 31, No. 7, pages 50–61; No. 8, pages 48–61; No. 9, pages 52–67; and No. 10, pages 48–67 (1955), can also be used.

In the preparation of sprays, the active herbicidal compounds can be dispersed separately in water or other liquid carriers and then mixed together. Alternatively, the herbicidal compounds can be mixed one with the other and the resulting mixture dispersed in the liquid carrier.

Still another method of preparing these compositions is to mix the herbicidal compounds with a finely divided carrier or dust, such as talc, pyrophyllite, natural clays, diatomaceous earth or other powder diluent, preferably of less than about 50 microns in average particle diameter, such as those set out in the aforementioned U.S. patent. The resulting mixture can be dispersed in water. Any compatible wetting or dispersing agent can be employed in the mixture either before or after mixture of the active ingredients with the liquid to obtain spray compositions.

Dust compositions of the invention are obtained by mixing the active herbicidal compounds or mixed salts with finely divided solids such as talc, pyrophyllite, natural clays, diatomaceous earth, and other powder diluents such as aforementioned to give homogeneous, free-flowing dusts or powders. The amount of the herbicidal compounds included in such dusts will vary with the manner in which the composition is to be applied, but in general the dust will contain from about 0.1% to 95% by weight of herbicidally active compounds.

Liquid compositions of the invention contain active components either homogeneously dispersed in water or non-solvent carriers, or dissolved in water or a solvent. To secure homogeneous dispersions in non-solvent liquid adjuvants, a surface-active agent of the wetting, dispersing or emulsifying type is used. In fact, it is preferred that the herbicidal compositions of the invention whether in liquid or in solid form contain the herbicidally active compounds or mixed salt homogeneously admixed with such a surface-active agent.

Generally, the wetting, dispersing, or emulsifying agent will not comprise more than about 5–15% by weight of the composition, and with the better surface-active adjuvant materials, the percentage ordinarily will be 5% or less. Usually, the minimum lower concentration will be 0.1%.

The herbicidal compositions are applied either as a spray or a dust to the locus or area to be protected from weeds. Such application can be made directly upon the locus or area and the weeds thereon during the period of weed infestation in order to destroy the weeds, or alternatively, the application can be made in advance of an anticipated weed infestation to prevent such infestation.

Thus, the compositions can be applied as aqueous foliar sprays, and can also be applied as sprays directly to the surface of the soil. Alternatively, the dry powdered compositions can be dusted directly on the plants or on the soil.

The active ingredients are, of course, applied in amount sufficient to exert the desired herbicidal action. The amount of herbicidally active compounds present in the compositions as actually applied for destroying or preventing weeds will vary widely with the herbicidal activity of the active ingredients, the purpose for which the application is being made (i.e., whether for short term or long term control), the manner of application, the particular weeds for which control is sought, and like variables.

Thus, if highly active ingredients are to be used for control of weed infestations that plague food crops, the compositions containing the active ingredients are normally further diluted with a liquid to form a spray composition or with a powdered solid to give a dust containing relatively low concentration of the active compounds.

On the other hand, if used to sterilize soil as in the treatment of power line or railroad right-of-ways, one or more of the active ingredients may, if of relatively low order of activity, be used in high concentration.

In general, the herbicidal compositions as applied in the form of a spray or a dust will contain from about 0.02% to 95% by weight of the combined herbicidally active compounds.

The herbicidal combinations of this invention are particularly useful for destroying well-established mixed weed populations comprising woody vines and brush, such as Virginia creeper, trumpet vine, honeysuckle, locust seedlings, sumach and sassafras; grasses, such as crabgrass and quackgrass; and broadleaf weeds, such as lamb's quarter and pigweed. While any amount of herbicidal polychlorobenzoic acid compound will improve the effectiveness of herbicidal s-triazine compounds, and vice versa, it is generally preferred that the compositions of this invention contain the synergistic proportions above indicated.

To use the mixtures of this invention on noxious weeds, such as the above, it is generally preferred to apply about 2–400 pounds per acre of the herbicidal polychlorobenzoic acid mixed with 2–50 pounds per acre of the herbicidal s-triazine. More preferably 5–15 pounds per acre of the polychlorobenzoic acid and 5–25 pounds per acre of the s-triazine is employed.

The polychlorobenzoic acid compounds of Formula 1 can be prepared by the methods shown in the following references:

Claus et al., J. Parkt. Chem. 56, 48 (1897)
Cohen Dakin, J. Chem. Soc. 81, 1332 (1902)

The triazines of Formula 2 can be prepared by the methods shown in the following references:

Pearlman Banks, J. Am. Chem. Soc. 70, 3727 (1948)
Controulis and Banks, J. Am. Chem. Soc. 67, 1946 (1945)

In order that the invention can be better understood, the following examples in addition to those set forth above are given. The numbers following the tabulated ingredients represent parts by weight of the ingredients in the respective compositions.

*Example 1*

The following powdered compositions are adapted for dispersing in water for application as a spray for the destruction and prevention of weeds. The powdered compositions are made by intimately mixing the listed ingredients using conventional mixing or blending equipment and then grinding the mixtures to give powders having an average particle size less than about 50 microns in diameter.

(A) Percent 2-chloro-4,6-bis(ethylamino)-s-triazine _____ 50
2,3,6-trichlorobenzoic acid, dimethylamine salt _____ 25
Sodium lauryl sulfate (wetting agent) _____ 1
Sodium lignosulfonate _____ 3
Fuller's earth _____ 21

(B)

2-chloro-4,6-bis(ethylamino)-s-triazine _____ 45
2,3,5,6-trichlorobenzoic acid, sodium salt _____ 30
Alkylated aryl polyether alcohol (wetting and dispersing agent) _____ 4
Attapulgite clay _____ 21

(C)

2-ethylamino - 4 - isopropylamino-6-chloro - 1,3,5-triazine _____ 45
2,3,6-trichlorobenzoic acid, dimethylamine salt _____ 30
Sodium lauryl sulfate _____ 1
Sodium lignosulfate _____ 3
Fuller's earth _____ 21

(D)

2,4-bis(isopropylamino)-6-methoxy-s-triazine _____ 70
2,3,4,6-tetrachlorobenzoic acid, dimethylamine salt __ 10
Alkyl naphthalene sodium sulfate (wetting and dispersing agent) _____ 2
Attapulgite clay _____ 18

(E)

| | |
|---|---|
| 2-bromo-4,6-bis(allylamino)-s-triazine | 65 |
| 2,3,6-tetrachlorobenzoic acid, sodium salt | 5 |
| Aryl alkyl sulfonate, sodium salt (wetting agent) | 2 |
| Goulac (dispersing agent) | 3 |
| Florida fuller's earth | 25 |

These compositions are extended with 200 gallons of water to 60 pounds of active ingredient and applied at the rate of 60 pounds per acre of the active ingredient on vegetation growing around power transformers. Excellent control of honesuckle, Virginia creeper, yellow foxtail, crabgrass, annual ragweed, rough pigweed, lamb's-quarters, Kentucky bluegrass and Canada thistle is obtained for an extended period. Similar results are obtained using 200 gallons water to 25 pounds of active ingredient applied at 25 pounds per acre.

These compositions are also extended with 40 gallons water to 3 pounds of active ingredient and with a hand-operated pressure sprayer as a pre-emergence treatment on corn at a rate of 3 pounds per acre of active ingredient. Excellent control of annual broadleaf and grass weeds is obtained.

Example 2

The following powdered compositions are adapted for use in the preparation of spray compositions using either an oil, water, or a combination of oil and water as the liquid diluent. The powders are made by mixing and grinding as in the case of the powders of Example 1.

(A) Percent

| | |
|---|---|
| 2-chloro-4,6-bis(ethylamino)-s-triazine | 75 |
| Polychlorinated benzoic acids comprising 3.4% pentachloro, 51.7% tetrachloro, 31.6% trichloro, 13.3% dichloro | 6 |
| Polyethylene oxide esters of mixed fatty and resin acids | 5 |
| Pyrophyllite | 14 |

(B)

| | |
|---|---|
| 2-methoxy-4-ethylamino-6-isopropyl-s-triazine | 6 |
| 2,3,6-trichlorobenzoic acid, ammonium salt | 60 |
| Polyethylene oxide esters of mixed resin and fatty acids concreted with urea | 4 |
| Micaceous talc | 30 |

(C)

| | |
|---|---|
| 2-chloro-4-methylamino-6-ethylamino-s-triazine | 25 |
| 2,3,5-trichlorobenzoic acid, monomethylamine salt | 50 |
| Fine silica | 22 |
| Polyethylene oxide esters of mixed fatty and resin acids | 3 |

These compositions are extended with 200 gallons of diesel oil to 40 pounds of active ingredient and applied at the rate of 40 pounds per acre of active ingredient to vegetation growing along a railroad right-of-way. Excellent control of this undesirable vegetation which includes broadleaf and grass weeds, is obtained.

Example 3

The following compositions are in liquid form and are adapted for addition to water to give an aqueous dispersion for application as sprays.

(A) Percent

| | |
|---|---|
| 2-methoxy-4-isopropyl-6-(3-methoxypropylamino)-s-triazine | 20 |
| Polychlorinated benzoic acids comprising 2% pentachloro, 17.8% tetrachloro, 80.2% trichloro | 30 |
| Kerosene | 46 |
| Alkylated aryl polyether alcohol (wetting and emulsifying agent) | 3 |
| Low-viscosity methyl cellulose (dispersing agent) | 1 |

(B)

| | |
|---|---|
| 2,4-bis(isopropylamino)-6-methoxy-s-triazine | 22 |
| 2,3,5,6-tetrachlorobenzoic acid, dimethylamine salt | 22 |
| Polyoxyethylene sorbitan monolaurate | 4 |
| Kerosene | 52 |

These aqueous dispersions are extended with 200 gallons water to 45 pounds of active ingredient and applied at a rate of 45 pounds per acre of active ingredient for control of weeds along a cyclone fence. Excellent control of annual broadleaf and grass weeds and woody vines is obtained.

Example 4

The following compositions are adapted for direct application as dusts for the destruction or prevention of weeds using conventional dusting equipment. The dusts are made by blending or mixing the active ingredients and minor diluent, then grinding the mix and subsequently blending with the major diluent to give free-flowing compositions.

(A) Percent

| | |
|---|---|
| 2-bromo-4,6-bis(ethylamino)-s-triazine | 3 |
| 2,3,5,6-tetrachlorobenzoic acid, sodium salt | 3 |
| 2,3,5-trichlorobenzoic acid, sodium salt | 3 |
| Hydrocarbon oil | 3 |
| Micaceous talc | 88 |

(B)

| | |
|---|---|
| 2-methoxy-4,6-bis(ethylamino)-s-triazine | 3 |
| 2,3,5-trichlorobenzoic acid, potassium salt | 1 |
| Hydrocarbon oil | 2 |
| Walnut shell flour | 20 |
| Tobacco dust | 76 |

(C)

| | |
|---|---|
| 2-chloro-4,6-bis(ethylamino)-s-triazine | 1 |
| 2,3,4,6-tetrachlorobenzoic acid, dimethylamine salt | 5 |
| Fine silica | 14 |
| Pyrophyllite | 80 |

(D)

| | |
|---|---|
| 2,4-bis(isopropylamino)-6-methoxy-s-triazine | 2 |
| 2,3,6-trichlorobenzoic acid | 4 |
| Fine silica | 14 |
| Pyrophyllite | 80 |

The above formulations are applied by hand at a rate of 850 pounds per acre for vegetation control around power transformers, electric light poles, and telephone poles. Outstanding control of undesirable weeds such as woody vines and annual grasses is obtained.

Example 5

The following compositions are adapted for application by fertilizer spreader apparatus or similar equipment. The compositions are readily prepared by mixing the ingredients with water to form a paste. The paste is then extruded, dried and ground to give the desired granular size. Preferably, the granules will be in the order of ½₂ to ¼ inch diameter.

(A) Percent

| | |
|---|---|
| 2-chloro-4,6-bis(ethylamino)-s-triazine | 5 |
| 2,3,6-trichlorobenzoic acid | 10 |
| Sodium lignosulfonate | 4 |
| Hydrocarbon oil | 1 |
| Dextrin (binding agent) | 20 |
| Fuller's earth | 60 |

(B)

| | |
|---|---|
| 2-chloro-4,6-bis(methylamino)-s-triazine | 7 |
| 2,3,5,6-tetrachlorobenzoic acid | 3 |
| Sodium alkyl aryl sulfonate | 3 |
| Talc | 63 |
| Gelatin | 24 |

(C)

| | |
|---|---|
| 2-chloro-4,6-bis(propylamino)-s-triazine | 1 |
| 2,3,6-trichlorobenzoic acid, dimethylamine salt | 9 |
| Goulac (dispersing agent) | 3 |
| Refined kerosene | 1 |
| Gelatin | 25 |
| Micaceous talc | 61 |

(D)

| | |
|---|---|
| 2-chloro-4,6-bis(3-methoxypropylamino)-s-triazine | 9 |
| 2,3,5,6-tetrachlorobenzoic acid, dimethylamine salt | 1 |
| Goulac (dispersing agent) | 3 |
| Straight-chain hydrocarbon | 1 |
| Dextrin (binding agent) | 11 |
| Gelatin | 15 |
| Fuller's earth | 60 |

These formulations are applied with a specially adapted fertilizer spreader at a rate of 500 pounds per acre for control of weeds growing adjacent to warehouse walls. Good control of broadleaf and grasses is obtained for an extended period of time.

*Example 6*

The following powdered composition is prepared:

| | Percent |
|---|---|
| 2,4-bis(isopropylamino)-6-methoxy-s-triazine | 20 |
| Mixture of polychlorinated benzoic acid in the form of their dimethylamine salts comprising 80.2% trichloro, 17.8% tetrachloro, 2% dichloro | 40 |
| Fine silica | 35 |
| Polyethylene oxide esters of mixed fatty and resin acids | 5 |

This composition is extended with kerosene so that 30 pounds of combined active ingredients in 150 gallons of oil is sprayed per acre. Excellent control of a mixed population of crabgrass, quackgrass, trumpet vine, honeysuckle, sumach, lamb's quarter, foxtail and pigweed is obtained.

*Example 7*

The following compositions are prepared:

| (A) | Percent |
|---|---|
| 2-chloro-4,6-bis(ethylamino)-s-triazine | 55 |
| Alkyl aryl polyether alcohol | 5 |
| Attapulgite | 40 |

(B)

| | |
|---|---|
| 2,3,6-trichlorobenzoic acid, dimethylamine salt | 30 |
| Alkyl naphthalene sulfonic acid, sodium salt | 1.0 |
| Sodium ligninsulfonate | 0.5 |
| Synthetic fine silica | 68.5 |

Composition A is dispersed in fuel oil and sprayed on a plot containing a mixed population of woody vines, brush, grass and broadleaf weeds at the rate of 20 pounds per acre of active material in 50 gallons of oil. Immediately thereafter composition B in water is sprayed on the same plot at the rate of 10 pounds per acre in 40 gallons of water. Excellent control of this undesirable vegetation is obtained.

This application is a continuation-in-part of copending application, Serial No. 780,963, filed December 17, 1958, which in turn is a continuation-in-part of application, Serial No. 649,303, filed March 29, 1957, and now abandoned.

The embodiments of the invention in which an exclusive property or privilege is claimed are:

1. A method for destroying weeds, said method comprising the application, to a locus to be protected, of about 5–15 pounds per acre of 2,3,6-trichlorobenzoic acid, dimethylamine salt admixed with about 5–25 pounds per acre of 2,4-bis(ethylamino)-6-chloro-1,3,5-triazine.

2. A herbicidal composition comprising 2,3,6-trichlorobenzoic acid, dimethylamine salt admixed with 2,4-bis(ethylamino)-6-chloro-1,3,5-triazine, the ratio of the benzoic acid compound to the substituted triazine compound ranging from about 0.05:1 to 20:1, the total amount of the mixture of said benzoic acid and triazine compound being sufficient to form a herbicidally effective composition.

References Cited in the file of this patent

UNITED STATES PATENTS

| | | |
|---|---|---|
| 2,394,916 | Jones | Feb. 12, 1946 |
| 2,848,470 | Girard et al. | Aug. 19, 1958 |
| 2,891,855 | Gysin et al. | June 23, 1959 |
| 2,992,913 | Pleiffer | July 18, 1961 |
| 3,014,965 | Newcomer et al. | Dec. 26, 1961 |

FOREIGN PATENTS

| | | |
|---|---|---|
| 613,815 | Canada | Jan. 31, 1961 |